July 24, 1956   C. HIMMLER   2,755,626
HYDRAULIC REMOTE CONTROL DEVICE
Filed May 11, 1955

INVENTOR
Conrad Himmler
BY
Cameron, Kerkam & Sutton
ATTORNEYS

United States Patent Office 2,755,626
Patented July 24, 1956

2,755,626

HYDRAULIC REMOTE CONTROL DEVICE

Conrad Himmler, Les Essarts-le-Roi, France, assignor to Centre de Recherches Hydrauliques et Electriques, Paris, France Application May 11, 1955, Serial No. 507,710

Claims priority, application France May 15, 1954

2 Claims. (Cl. 60—52)

The present invention relates to a hydraulic remote control device in which operation of a control member situated at a control station effects the displacement of a liquid column which is contained in a system of ducts and imparts to an output member a movement whose amplitude is a predetermined ratio of the movement of the control member.

It has, however, been ascertained that in practice the hydraulic devices constructed according to the aforesaid principle do not permit a satisfactory agreement between the respective movements of the control and output member.

The deviations from agreement are due notably to the compressibility and expansion of the liquid, to the expansion of the conduits, to the friction of the mechanical members and to the friction of the liquid in conduits of small diameter, as well as to leakages.

Therefore these devices have been provided with various auxiliary devices such as automatic null correction means, temperature compensators etc., yet without attaining the results aimed at.

In the remote control device forming the subject of the present invention the movements of the receiver member are not directly subject to those imparted to the liquid column by means of the control member but to those of a movable element of an intermediary relay which functions in the manner of a manometer.

It is known that the indication of pressure effected by a manometer is comparatively accurate since it is independent of leakages, of the viscosity of the fluid, and of the temperature; also the indication is produced practically without any delay.

The known manometers do not however allow the transmission of a force larger than that required for the operation of an indicating member, or a manometric switch or the like.

The new device offers the feature of responding with the precision of a manometer while at the same time increasing to the extent desired, the forces applied to it.

Accordingly, the invention consists in that it comprises a driving motor driving simultaneously three volumetric pumps of constant output, two of which discharge a supply liquid under pressure into two distinct chambers in such a manner as to apply to an output member two actions in opposite directions, the pressures of the supply fluid in the said two chambers being controlled by two slide valves each of which is mounted on the discharge side of one of the said two pumps and the displacements of which are controlled by the movable element of a manometric chamber supplied by the third pump, the said movable element being subject to the bias of a spring which also bears on the output member, while the pressure in the manometric chamber thus formed is controlled by means of a valve which is connected to the discharge side of the said pump.

In this device the two slide valves and the movable element of the manometer chamber are relieved from static friction, and for this purpose are constituted by members displaceable axially with respect to the member partaking in the rotation of the respective pumps.

In the accompanying drawings there is illustrated diagrammatically an embodiment of a remote control device according to the invention which will be described hereinafter by way of example.

Figure 1:
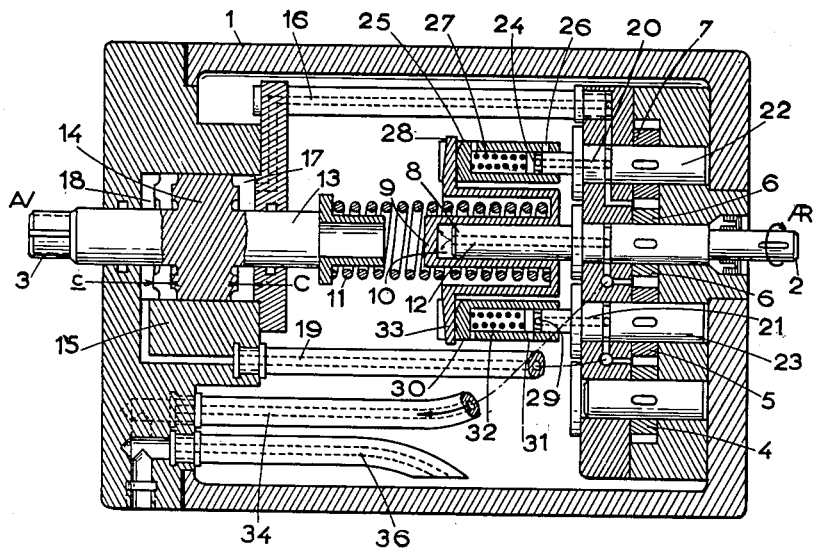
Figure 1 is a longitudinal section along the axis of the apparatus.

In Figure 1, the driving shaft 2 is journalled in a casing 1 which serves as an oil reservoir, and is driven at constant speed by a motor (not shown); the output member is constituted by a shaft 3 adapted to move rectilinearly.

The driving shaft 2 rotates three gear pumps which are respectively constituted by the identical pairs of pinions 4—5, 5—6, 6—7.

The driving shaft 2 is extended by a cylindrical portion 8 which constitutes an axially restrained plunger upon which a cylinder 9 is slidable, which defines a space 10 and is subject to the action of a spring 11.

This space 10 thus constitutes a manometric chamber which is supplied with oil under pressure through a conduit 12 provided in the plunger 8 by the pump 5—6.

The spring 11 abuts on its other end on the rod 13 of a piston 14, which is adapted to move in a fixed cylinder 15, and the opposite rod of which forms the output shaft 3.

The pump 6—7 supplies oil under pressure through a conduit 16 to the space 17 situated behind the piston 14 while the space 18 situated in front of this piston is supplied through the conduit 19 by the pump 4—5.

From the conduits 16 and 19 the ducts 20 and 21, respectively, are formed in the extensions of the shafts 22 and 23 on which the pinions 5 and 7 of the pumps are keyed.

The conduit 20 issues into a circular groove 24 provided on the shaft 22 which serves as a guide to a cylindrical slide valve 25 which is provided with a window 26 and is subject to the action of a spring 27 tending to bear on an arm 28 which is integral with the cylinder 9.

Likewise, the duct 21 issues into a circular groove 29 provided in the shaft 23 on which is mounted a cylindrical slide valve 30 provided with a window 31 and subject to the action of a spring 32 which tends to bear against a second arm 33 integral with the cylinder 9.

From the duct 12, which connects the pump 5—6 to the manometric chamber 10 a conduit 34 is branched off through which oil under pressure is directed to a control valve 35 (Figure 2), the return of the oil to the casing 1 being by way of a conduit 36.

Figure 2:
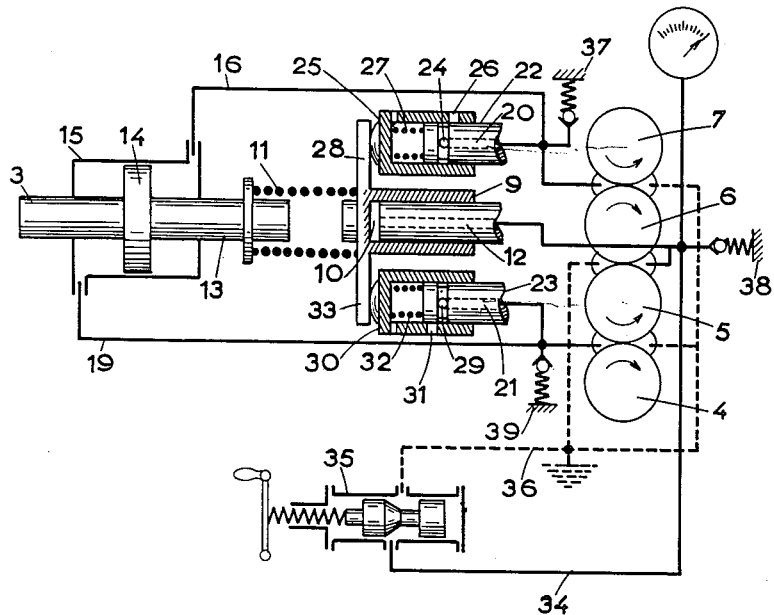
Figure 2 is an assembly diagram.

The controllable discharge valves 37, 38 and 39, diagrammatically represented in Figure 2, are mounted on the output side of the three pumps.

The functioning of the remote control device thus constituted, is as follows:

Assuming the device to be in the equilibrium position represented in Figure 1, the piston 14 has performed in the cylinder 15 a stroke of the length C, being submitted on its two faces to two equal pressures supplied by the pumps 4—5 and 6—7.

It will be noted that the window 26 of the slide valve 25 issues behind the groove 24, while the window 31 of the slide valve 30 issues ahead of the groove 29.

To this equilibrium position correspond a predetermined stressing of the spring 11 and a predetermined pressure in the manometric chamber 10, which pressure is in turn a function of a predetermined position of the control valve 35 (Figure 2).

Assuming an operation of the control valve 35 in the sense of a reduction of pressure in the manometric chamber 10: The spring 11 bears against the rear of the cylinder 9, which by its arms 28 and 33 makes the slide valves 25 and 30 slide on their respective axles 22 and 23.

The port 31 of the slide valve 30 then moves so that it is in juxtaposition to the groove 29, thus effecting a discharge on the output of the pump 4—5, and consequently a lowering of the pressure in the chamber 18.

The slide valve 25, by being displaced, has not modified the pressure on the discharge side of the pump 6—7, since the port 26 has moved away from the groove 24. The piston 14 with which the output shaft 3 is integral is constrained to displace itself forward under the effect of the constant pressure in the chamber 17.

By displacing itself, the piston 14 carries along the abutment of the spring 11, the stressing of which is thereby reduced.

The control pressure in the manometric chamber 10 can accordingly move the cylinder 9 forward, in the direction towards the position of a new equilibrium between the said pressure and the stress of the spring 11.

Under the action of their respective springs 27 and 32, the slide valves 25 and 30 are likewise moved forward, the slide valve 25 reducing progressively the discharge on the output of the pumps 4—5, and consequently the pressure difference in the chambers 17 and 18.

At a certain moment, equilibrium is re-established between the pressure in the manometric chamber 10 and the stressing of the spring 11, the piston 14 then occupying a predetermined position in which the slide valves have returned to their initial obturating positions.

Thus a new equilibrium position is established for which the displacement c effected by the piston 14 is a function of the reduction of pressure introduced into the manometric chamber.

In the case of an increase of the pressure set up in the manometric chamber, the cylinder 9 will move forward, and the simultaneous displacement of the slide valve 25 in the forward direction will produce a reduction of the pressure in the chamber 17; the piston 14 will accordingly move rearwardly until it has reached its new equilibrium position.

The hydraulic device constructed in this manner functions with the accuracy of a manometer. It is independent of the viscosity of the oil, of the temperature and of the leakages. The effects of static friction on the cylinder and on the control slide valves are eliminated owing to the rotation of the corresponding pistons.

To each position of the control valve corresponds accordingly an equilibrium position of the manometric system, and consequently a predetermined position of the output member, the indication of which position may be effected by an ordinary manometer connected to the manometric control chamber.

The force of the driving motor is proportional to the speed of displacement of the output shaft.

For a predetermined discharge pressure of the pumps, the force which can be transmitted is a function of the diameter selected for the piston of the output shaft, the stroke of which can attain comparatively large values.

Finally, the sensitivity of the device can be adapted to different applications by an appropriate choice of the spring of the manometric chamber.

The device as described hereinabove can be modified or supplemented by any useful accessory, without departing from the scope of the invention as defined in the appended claims.

Thus, for example, the movable member 9 of the manometric chamber as well as the slide valves 25 and 30, instead of being constituted by cylinders displacing themselves upon the respective plungers formed by the extensions of the shafts 2, 22 and 23, could themselves be constituted by plungers displacing themselves in the interior of cylinders integral with the said shafts.

Alternatively, the output piston 14, instead of being constituted by a simple piston displaceable in a cylinder, it could be constituted by a rotary piston motor giving for example, by means of a screw system, the translation movement of the output member 3.

Finally, the manometric chamber could be used for controlling simultaneously the position of several output members, the displacement of which could vary from one output member to another as a function of the diameters selected for their pistons.

What I claim is:

1. A hydraulic remote control device having a manometric operation designed for controlling the position and the displacements of a movable output member as a function of the positions occupied by a control valve situated at a distance, which comprises three simultaneously driven volumetric pumps of constant output, two of which discharge a supply liquid under pressure into two distinct chambers in such a manner as to apply to said output member two actions in opposite directions, the pressures of the supply fluid in the said two chambers being controlled by two slide valves each of which is mounted on the discharge side of one of the said two pumps and the displacements of which are controlled by the movable element of a manometric chamber supplied by the third pump, the said movable element being subject to the bias of a spring which also bears on said output member, while the pressure in the manometric chamber thus formed is controlled by means of said control valve which is connected to the discharge side of the said third pump.

2. A hydraulic remote control device according to the claim 1, in which the said movable element of the manometric chamber and the two slide valves are displaceable axially with respect to members in which the conduits of the respective pumps are provided and which rotate with the said pumps.

No references cited.